Sept. 23, 1969  W. M. CHARMAN, JR., ETAL  3,468,368
HOT TOPS
Original Filed Oct. 7, 1966
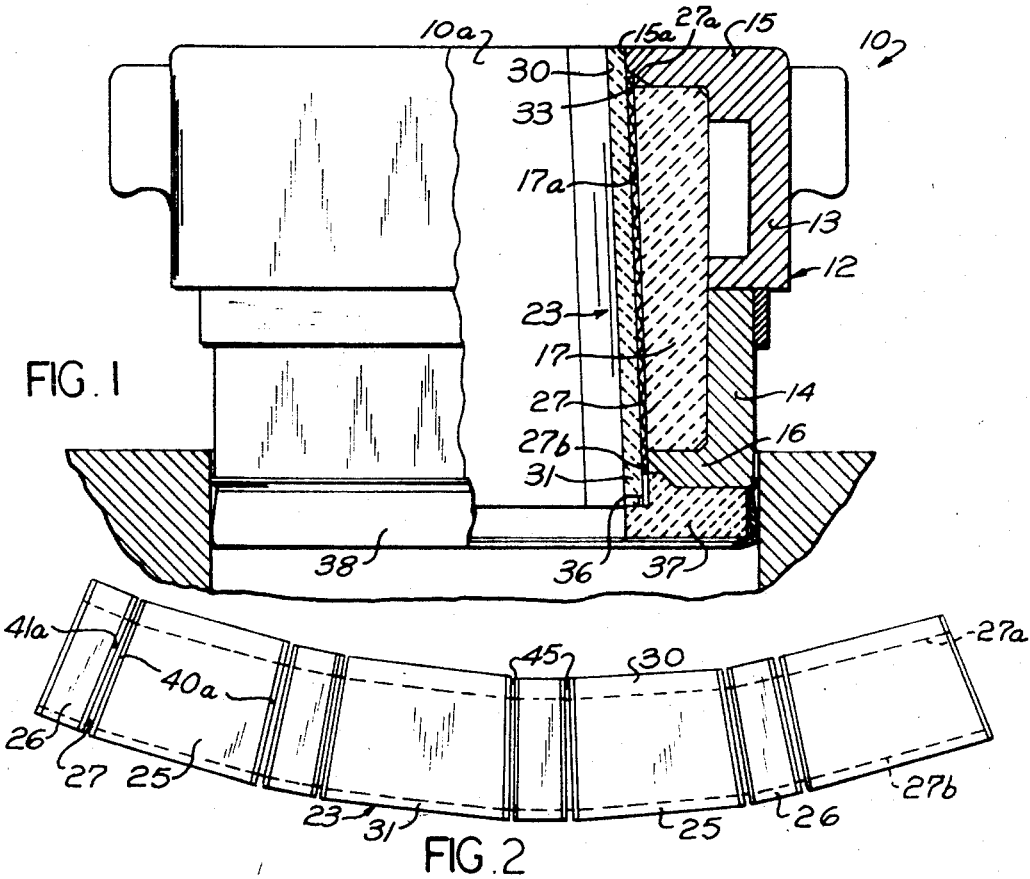
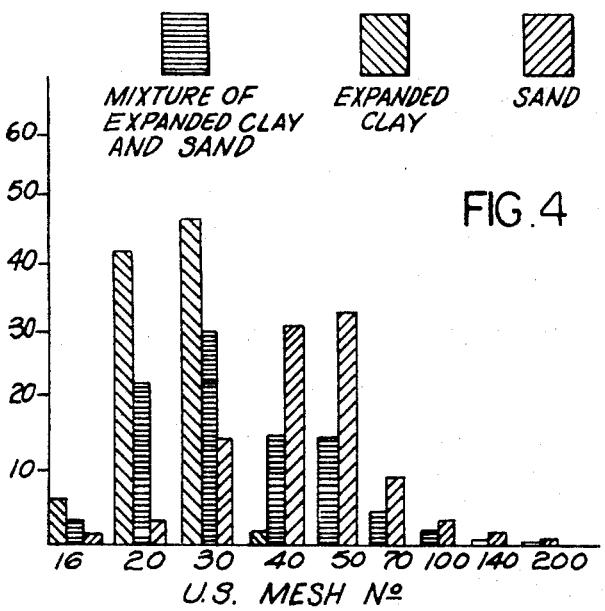
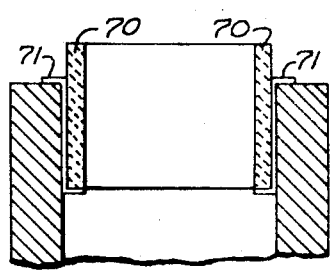
INVENTORS
WALTER M. CHARMAN JR.
JAMES H. BORDEN
BY
ATTORNEYS United States Patent Office 3,468,368
Patented Sept. 23, 1969

3,468,368
HOT TOPS
Walter M. Charman, Jr., Shaker Heights, and James H. Borden, Cleveland, Ohio, assignors to Oglebay Norton Company, Cleveland, Ohio, a corporation of Delaware
Application Oct. 7, 1966, Ser. No. 598,554, which is a continuation-in-part of application Ser. No. 398,664, Sept. 23, 1964. Divided and this application Sept. 5, 1968, Ser. No. 757,684
Int. Cl. B22d 7/10; B22c 1/26; C04b 35/14
U.S. Cl. 164—359                                             7 Claims

ABSTRACT OF THE DISCLOSURE

A hot top refractory member comprises a body having a surface adapted to contact molten metal. The body is constructed of a material including 15 to 85 parts by weight of a cellular granular clay material having a density of approximately 25 to 35 lbs. per cu. ft., 15 to 85 parts by weight of sand, 3 to 20 parts by weight of a binder, and 0 to 6 parts by weight of a cereal binder.

---

This application is a division of application Ser. No. 598,554 field Oct. 7, 1966, which in turn was a continuation-in-part application of copending United States application, Ser. No. 398,664, filed Sept. 23, 1964, now abandoned.

The present invention relates to a refractory material for use in the construction of hot top structures, and, more particularly to a refractory panel forming a part of a hot top and which contacts the molten metal poured into the ingot with which the hot top is associated.

In hot topping operations, it is often necessary to manually or otherwise handle refractory hot top structures, such as refractory panels. Depending upon the size of the ingot to be poured, the size of the hot top will vary and the size of the above-mentioned panels will likewise vary. Because of the handling of these panels, it is desirable to construct the panels so that their weight is minimized. However, the mechanical strength and thermal properties of the panels must meet the requirements for the particular use to which the panel is to be put.

In accordance with the present invention, refractory hot top panels are made of a lightweight, highly insulating, expanded clay material. The expanded clay material is a granular aggregate made by a process in which clay pellets are bloated so as to create a porous particle. This granular aggregate has a density of approximately 25–35 lbs. per cu. ft. The density of raw clay, of course, varies depending upon its particle size, and is in the range of 65–90 lbs. per cu. ft. Moreover, the expanded clay material has a fusing temperature such that it retains its cellular structure when used as a material in a hot top refractory panel which contacts molten steel.

A further advantage of this expanded clay material is the structural strength of the expanded pellets. They can be shipped, stored, handled, and mulled in a muller with little or no degradation and loss of cellular structure, as compared to other lightweight aggregate materials, such as crushed-up insulating brick grog, which is relatively fragile, and breaks up in handling as above.

This expanded clay aggregate clearly differs from other clay materials, having a density considerably less than a clay aggregate, raw or calcined, which has been used as a material in a hot top structure as disclosed in United States Patent No. 1,984,759. Calcined fire clay is slightly less dense than raw fire clay and is not a substitute for the expanded clay aggregate of the present invention. Furthermore, the density of calcined fire clay is only slightly lighter than the raw clay.

The method of manufacturing the expanded clay is set forth in general in The Ceramic Bulletin, 1964, volume 43, issue No. 5, pp. 408, 409. In general, the material is made by placing clean finely ground clay which has been brought to a paste consistency in a slinger head in a drier. The slinger head consists of a perforated band which revolves at some 3,000 r.p.m.'s. At this speed, centrifugal force hurls the paste through holes in the outer rim of the slinger head which causes the paste to be formed into pellets. The pellets are dried in the drier. The dried pellets then flow through the firing chamber of a furnace whose walls are at 2800–3000° F., where they are bloated and vitrified. The pellets consist of substantially porous cellular grains, and have refractory properties similar to those of the fire clay from which they were formed.

In accordance with the present invention, the expanded clay material is used in the making of hot top structures, such as refractory panels and specifically is mixed with sand and a binder, giving the panels a density within the range of 30–90 lbs. per cu. ft., depending on the sand-expanded clay ratio, and a modulus of rupture of at least approximately 250 lbs. per sq. in. or more. The panels are generally made of a thickness of between 1″ and 2″. The panels have insulating properties of heat capacity and thermal conductivity (K factor) approximately equivalent to an insulating firebrick panel of the equivalent density and thickness.

The principal object of the present invention is the provision of a new and improved lightweight hot top insulating refractory member made of a material including expanded clay, sand, and a suitable binder in the proportion required to provide the member with the proper mechanical strength, thermal properties and density.

Another object of the present invention is the provision of a new and improved hot top member which is relatively light in weight and has a multitude of small air pockets or spaces distributed throughout and which pockets are defined by porous grains of a cellular refractory expanded clay of which the panel is partially constructed.

A still further object of the present invention is the provision of a new and improved hot top member made of a material including 15 to 85 parts by weight of sand, 15 to 85 parts by weight of an expanded cellular clay material, and 3 to 20 parts by weight of a suitable binder.

Another object of the present invention is the provision of a new and improved hot top insulating refractory panel made of a material including expanded clay, sand, and a binder and having a density of 30–90 lbs. per cu. ft., a modulus of rupture of at least approximately 250 lbs. per sq. in. and a thickness of between 1″ and 2″.

Further objects and advantages of the present invention will be apparent to those skilled in the art to which it relates from the following detailed description of the preferred embodiment thereof made with reference to the accompanying drawings forming a part of this specification and in which:

FIG. 1 is a view, partly in elevation and partly in section of a hot top embodying the present invention and shown mounted in the open upper end of an ingot mold;

FIG. 2 is a plan view of a structure forming a part of the hot top shown in FIG. 1 prior to assembly thereof in the hot top;

FIG. 3 is a cross-sectional view of a hot top of a modified construction and embodying the present invention and shown mounted in the upper end of an ingot mold; and FIG. 4 is a graph illustrating a characteristic of the material of which parts of the hot tops of FIGS. 1 and 3 are made.

The preferred embodiment of the present invention is illustrated in FIG. 1 which shows a hot top 10 supported in the upper end of an ingot mold 11. The hot top 10 has a central opening 10a therethrough through which molten metal is poured into the ingot mold, and the hot top maintains a mass of molten metal above the ingot to feed the shrinkage cavity as the ingot cools, as is well known. The hot top 10 is herein shown as being similar in construction to the hot top disclosed in United States copending application, Ser. No. 398,629 owned by the assignee of the present invention.

The hot top 10 includes a metal casing 12 which is conventional in construction and includes an upper section 13 and a lower section 14, which are suitably secured together. The upper section 13 of the metal casing is provided at its upper end with an integral inwardly extending canopy or flange 15. The lower section 14 of the metal casing has at its lower end an integral inwardly extending lip or flange 16, which is of less inward extent than the flange 15.

In the illustrated hot top, the metal casing 12 is lined with an insulating material 17. The insulating material may take many forms, and, for example, may comprise a porous fragile, relatively good insulating brick having low thermal conductivity and low heat capacity and weighing approximately 55 pounds per cubic foot and having a rated use temperature of 2600° F. The equivalent insulating castable may be substituted for the above insulating brick.

This porous, fragile insulating brick or castable, if used to form the lining 17, has a maximum rated use temperature such that the lining 17 would be destroyed or severely damaged by the thermal shock of direct contact with molten steel so that it would have to be replaced after each pouring operation. This destruction or damaging of the lining 17 would be increased because of the mechanical abuses to which it would be subjected during the stripping of the hot top from the sink-head after the ingot has solidified. For both these thermal and mechanical damage reasons, a protective veneer must be used to protect such soft insulating brick in order to get repeated economical usage from such a lining.

The lining 17 may also comprise a hard dense, highly refractory firebrick or the equivalent weight and temperature service castable refractory which, because of its density and mass, has relatively high thermal conductivity and high heat capacity, and therefore relatively poor insulating characteristics, but has good mechanical strength, and therefore is easier to use and has a long economical life in a hot top because of its greater resistance to thermal shock and mechanical damage. Such a dense hot top lining, however, requires that a higher metal volume be poured to achieve metallurgical results equal to those obtained when more insulating brick linings are used, unless relatively lightweight, highly insulating, refractory panel means, as in the subject invention, is used in combination with such hard dense linings 17.

When dense brick or castable linings are used in combination with highly insulating refractory panels, equal metallurgical results can be obtained to those obtained with porous insulating brick linings, but with the advantage of using hard brick or castable linings 17 which are easier and more economical because of lower original cost and longer service life. It is also possible with highly insulating refractory panel means as in the present invention to use such panel means, when of sufficient thickness, directly against the cast iron casing or with lining 17 constructed of cast iron.

In the preferred embodiment, the insulating lining 17 is supported between the flanges 15 and 16 and it is semi-permanent in that it may be used for a number of pouring operations. The insulating lining 17 has an inner surface 17a which is tapered from the innermost end of the flange 16 upwardly toward the flange 15 and no part of the lining 17 extends inwardly beyond the flange 15. The lower end of the lining 17 does not extend inwardly of the hot top beyond the flange 16 and may be said to be flush therewith, the advantages of which will be clear as the description proceeds.

Refractory panel means including panels 25, 26 are used to overlie the lining 17 to protect the lining. The insulating refractory panels can be varied in insulating properties, as hereinafter described, for use with varying hot top linings 17 of different thermal and mechanical properties, as above described. The more dense refractory panels are used with soft insulating brick linings and are primarily designed to protect such brick from mechanical damage and thermal shock by providing a sufficient temperature drop or gradient between the temperature of the molten metal and the temperature to which the insulating lining 17 is subject so that the latter temperature is within the rated use of the lining. The lightening of such panels by additions of lightweight aggregate is primarily to facilitate handling of larger size panels.

Lighter, highly insulating refractory panels are designed primarily to provide in the insulating panels themselves all or almost all of the insulation required to produce a hot top sinkhead of the relatively low metal volume desired and required in the particular ingot casting operation. The insulating lining 17, whether light and insulating or more dense, is protected by such panel means and as a result, the lining 17 is a semi-permanent lining capable of being reused for a number of pouring operations.

In preparing the hot top for a pouring operation, the hot top is placed in a suitable stand in an inverted position, as is well understood in the art. The protective panel means in the form of a preformed panel insert unit 23 is then inserted into the interior of the hot top and placed in position in contact with the insulating lining 17. The insert unit 23 forms an annular protective layer around the interior of the hot top and protects the lining 17 from thermal shock.

The preformed insert unit 23, as shown in FIG. 2, for protecting the lining 17 comprises a plurality of the individual panels 25, 26 suitably secured to a flexible means or material 27. The panels 25, 26 form side and corner panels, respectively, and are secured to the flexible material 27 in any suitable manner, for example, by adhesives or mechanical means, such as rivets, pins, or clips. Alternatively, the panels may be molded and formed directly on the flexible material during the manufacture of the units.

The flexible means 27 preferably is corrugated cardboard. However, it is to be understood that any flexible material which has sufficient strength to support the inserts 25, 26 could be used, for example, cloth, cardboard strips, paper, fibrous material or pressure-sensitive tape may also be used. Moreover, a reinforcing wire screen may be used as a flexible means and may be embedded in the panels 25, 26.

The panels 25, 26 are supported by the flexible material and, in the preferred embodiment, on the cardboard sheet 27 in such a way that the annular edges 40a, 41a, respectively, of the panels are parallel and a small spacing 45 is provided between each of the panels. The spacing 45 is such that the insert unit 23 may be easily folded by grasping the opposite ends of the insert unit 23 and folding the flexible material along a line in the space 45 between the panels to an angle necessary to bring the adjacent edges of the panels into engagement. The positioning of the panels 25, 26 is such that when the flexible material is folded, the edges of the panels properly mate with a surface area contact and form a hollow geometric figure. During the preparation of the hot top for the pouring operation, the insert unit 23 is placed in the hot top, as noted above. Specifically, the hollow geometric figure formed by the insert unit is positioned over the inverted hot top and pushed into position.

In the illustrated embodiment, the cardboard material 27 does not completely overlie the panel inserts 25, 26. A small portion 30 of the panel inserts extends beyond the cardboard at one edge 27a thereof, while a portion 31 of the panels 25, 26 extends beyond the cardboard at the other edge 27b thereof. The portion 30 of the panel inserts extends so as to overlie the inner surface 15a of the flange 15 so that the leakage of molten metal between the flange 15 and the insert unit 23 is minimized and thereby flow of the molten metal into contact with the lining 17 which would cause damage thereto is minimized.

The edge 27a of the cardboard which is adjacent to portion 30 functions as a stop means for assisting in properly positioning the insert 23 in the hot top. The edge 27a engages a tapered surface portion 33 of the flange 15 when the insert 23 is inserted into the hot top. Thus, the insert unit is pushed into the hot top and stopped by the engagement of the cadboard with the tapered surface portion 33, whereby the insert panels 25, 26 are properly positioned and do not extend beyond the upper end of the hot top. Because of the tapered opening and the compressibility of the cardboard, the insert unit may be forced into the hot top in a manner that the adjacent edges 40a, 41a of the panels 25, 26 properly meet, minimizing the possibility of leakage therebetween. By compressing the cardboard when the insert 23 is pushed into position, the contacting surface areas at the adjacent edges of the panels 25, 26 are held in tight contact.

The portion 31 of the panels 25, 26 is received in a recess 36 in a bottom ring member 37 positioned on the bottom of the hot top. Positioning of the portion 31 of the inserts in the recess 36 minimizes leakage of the molten metal into the area behind the inert where it might contact and damage the lining 17. Moreover, by constructing the lining 17 so as to have its lower end flush with the flange 16, contact of the molten metal with the lining 17 is even further minimized, for the flange 16 has a surface area contact with the insert 23 at a location between the lining 17, on the one hand, and the abutting end of the portion 31 and the recess of the bottom ring, on the other hand. Moreover, the bottom end of the insert 23 bears against the inner end of the flange 16 which supports the bottom end of the insert so that it does not move outwardly upon pouring of the molten metal, which outward movement would result in an opening up of the area between the adjacent edges 40a, 41a of the panels 25, 26 and cause leakage therebetween. The flange 15 against which the upper end of the insert units bear provides a similar support for the upper end of the insert 23.

The bottom ring 37, of course, may be secured on the hot top casing in any conventional manner and a wiper strip 38 is also attached to the hot top and forms a portion thereof. The details of the bottom ring 37 are known in the art and will not be described. The wiper strip and bottom ring, of course, function in the usual and conventional manner.

It should be noted that since the central opening 10a of the hot top is tapered, the insert unit 23 when manufactured, that is, when in its flat condition, as illustrated in FIG. 2, is segmented and somewhat curved, and when folded, forms a trapezoidal shape. Moreover, the panels 25, 26 are tapered and the narrow ends of the panels overlie the surface 15a of the flange 15, as described hereinabove. The particular shape of the panels and the insert unit 23, of course, will vary depending upon the shape of the hot top in which they are used and whether or not the opening in the hot top is tapered.

According to the present invention, the refractory panels 25, 26 are made of a refractory insulating material which renders the panels extremely light in weight and gives the panels good insulating and thermal properties which make the panels 25, 26 extremely effective for use in a hot top. Moreover, the light weight of the panels provides for easy handling of the panels. The material of which the panels 25, 26 are made includes a lightweight cellular material, commonly referred to as expanded clay. The expanded clay may be in the form of unicellular or multicellular substantially rounded grains or bodies. The expanded clay is formed, as is known, in a fusing process wherein natural clay is caused to be bloated or formed into cellular substantially rounded grains in a suitable furnace, as noted hereinabove. This granular material is marketed under the trademark "SCR Veri-lite" and has a density of approximately 25–35 lbs. per cu. ft.

The material of which the panels are made preferably also includes a sand and a binder. The binder may be of any conventional form and may comprise a synthetic resin, silicone resin, or an organic resin. Preferably, a resin binder and a cereal binder, a well-known binder in the refractory art, are utilized in combination as the binder. In preparing the material of which the panels are made, the sand, expanded clay, and binder are mixed together in a conventional manner in a suitable vessel, such as a well-known muller and in the desired proportions, as set forth hereinbelow. A suitable amount of water is added to the mixture to facilitate the mixing and molding of the material. After the ingredients are thoroughly mixed, the panels are molded in a conventional manner and dried. A small percentage of kerosene may be added to the mixture to facilitate molding thereof.

The proportions of the various ingredients of the material of which the refractory panels 25, 26 are made may vary considerably. The expanded clay is an extremely good insulator and is extremely light in weight and as the percentage of the expanded clay increases in the mixture, the insulating properties of the panel made of the material are increased and the thermal efficiency of the hot top is increased. Moreover, the weight of the panel is decreased providing an extremely lightweight panel. However, as the percentage of the expanded clay in the mixture increases, the panels lose mechanical strength. On the other hand, as the percentage of the expanded clay decreases in the mix, the insulating properties of the panels are impaired and the weight of the panels is increased. However, the strength of the panels is also increased.

Table I, below, indicates various mixes which have been prepared and from which hot top panels have been made and the manufacturing range for each ingredient which provides highly acceptable panels.

TABLE I

| Ingredient | Mix (Parts by Weight) | | | | Manufacturing Range |
| --- | --- | --- | --- | --- | --- |
| | A | B | C | D | |
| Expanded clay | 40 | 50 | 60 | 100 | 15–85 |
| Sand | 60 | 50 | 40 | 0 | 15–85 |
| Cereal Binder | 3 | 3 | 3 | 3 | 0–6 |
| Resin Binder | 5 | 7 | 7 | 7 | 3–10 |
| Water | 15 | 15 | 15 | 15 | 10–20 |
| Kerosene | .25 | .25 | .25 | .25 | 0–.5 |

Table II, below, indicates the various ingredients which comprise the material forming the completed panels after drying of the molded panels with the manufacturing range of parts by weight of the ingredients in the panels.

TABLE II

| Ingredient: | Range (parts by weight) |
| --- | --- |
| Expanded clay | 15–85 |
| Sand | 15–85 |
| Cereal binder | 0–6 |
| Resin binder | 3–10 |

It should be noted that the water and kerosene added to the mix are not found in the final product since they are removed therefrom through the drying process.

While the manufacturing range of expanded clay as shown in Table II is from 15–85 parts by weight, for certain uses, the amount of expanded clay may be as much as 90 or 95 parts by weight with the remainder binder and without any sand at all in the panel, which would provide an extremely lightweight and highly insulating panel of rather poor mechanical strength. On the other hand, the amount of expanded clay in the product may be as little as 5 parts by weight which would provide a panel insert having slightly improved insulating properties over that which utilizes sand only, and of good mechanical strength. It should be apparent from the above that the specific proportions of sand, clay, and binder may be selected to provide a panel with the properties required for the desired use.

In hot tops utilizing a porous, fragile insulating brick of relatively good insulating properties for the lining 17, the percentage of expanded clay in the protective panel may be relatively low, since in such a case the lining 17 would provide the major insulation. In hot tops utilizing the high grade, hard dense brick, of relatively poor insulating properties, the percentage of expanded clay may be higher in order for the protective panel to provide the major insulation required for the molten metal. Thus, it can be seen that as the properties of the lining 17 vary, the percentage of the expanded clay in the panels may vary to provide for best results.

When the panels mounted on flexible material, such as shown in FIG. 2, are to be used in connection with a hard castable lining, such as one having a density of 120–140 lbs. per cu. ft., the density of the panels should be in the range of approximately 30 lbs. per cu. ft. to 60 lbs. per cu. ft. The panels should have a minimum modulus of rupture of about 250 lbs. per sq. inch. The panels would also have a thickness range of between 1" and 2". The mixes A:D stated above are of these approximate range limits. That is mix D provides a panel having a density of about 30 lbs. per cu. ft., while mix A above provides a panel having a density of approximately 60 lbs. per cu. ft. Therefore, the mixes A and D represent the extremes for the range of materials used in making panels for use in connection with hard castable or on cast iron. A more narrow and preferred range is the range between mixes A and C.

The grain size of the expanded clay is quite large with more than 90 percent of the expanded clay having a grain size larger than 30 U.S. mesh. The sand utilized in the mixture with the expanded clay preferably is a coarse sand, known in the art as 40/60 sand, and has a grain size such that 90 percent thereof has a grain size greater than 70 U.S. mesh. Of course, depending upon the amount of expanded clay in the mixture, the type of sand and grain size of the sand utilized may vary. More than 90 percent of the mix of sand and expanded clay in the preferred ranges has a grain size greater than 140 U.S. mesh, and preferably 20–80% of the mix has a grain size greater than 30 mesh.

The bar graph of FIG. 4 shows the grain size of the expanded clay and of the 40/60 sand and of the mixture of the 40/60 sand and expanded clay for a mix having equal weights of sand and expanded clay, that is, Mix B, as shown in Table I above. The legend accompanying the bar graph indicates which bars designate the mix, sand, and expanded clay. It should be apparent from the graph that the largest percentage of the mix has a grain size within the range of greater than 30 U.S. mesh and less than 20 U.S. mesh and the percentage of the mix at other grain sizes decreases as the grain size increases and decreases from the grain size of the largest percentage of the mix.

The panels formed from the material disclosed hereinabove are molded into the desired shape and thickness for the particular insert or hot top in which they are to be used and are dried into self-sustaining separate panels having substantially parallel faces. The panels, of course, include the expanded clay bonded together with sand and the binder in a unitary structure with the cells of the expanded clay providing the desired porosity in the panel. When the panels made of the above-disclosed material are inserted into the hot top, the molten metal contacts the panels causing the panels to weaken and readily collapse, which is a desirable property in hot top insulating panels, and permits easy cleaning of the lining 17 of the hot top and stripping of the hot top from the ingot. Moreover, the material including the expanded clay will not soften at temperatures normally encountered in connection with molten steel. Thus, the material is capable of withstanding extremely high temperatures without fusing and has substantial insulating properties, as well as permitting easy handling of the panel.

Panels made of the material disclosed above may be used in any type of hot top, and FIG. 3 illustrates a modified form of hot top structure in which panels made of the material disclosed above are embodied. In FIG. 3, the hot top is comprised of a plurality of panels 70 of the insulating material which are suitably connected together in a conventional way to form a hot top and which are supported at the upper end of an ingot mold by a plurality of hot top supporting hooks 71. The panels which comprise the hot top may be formed of the material disclosed hereinabove and, and in effect provide a one-use hot top.

The refractory material or composition disclosed hereinabove may be used in numerous ways in hot top structures and the modifications shown in FIGS. 1 and 3 are merely two illustrated ways of utilizing the material in a hot top structure. The mixture disclosed hereinabove or the composition disclosed hereinabove may be utilized with or in conjunction with multilayer inserts or hot top panels wherein the layer of the panel which is to engage the molten metal is made of an exothermic material, as is well known, and which may be mounted on or bonded to a layer of the material disclosed hereinabove, or where the material disclosed hereinabove is bonded on or connected to various other materials which function as backings for the material disclosed above.

It should be apparent that the preferred embodiments of the present invention has been described in considerable detail and it is to be understood that the invention is not limited thereto but is to be construed as including all variations thereof which are covered by the appended claims.

Having described our invention, we claim:

1. A hot top refractory member comprising a body having a surface adapted to contact molten metal, said body being constructed of a material including 15 to 85 parts by weight of a cellular granular clay material having a density of approximately 25 to 35 lbs. per cu. ft., 15 to 85 parts by weight of sand, 3 to 20 parts by weight of a binder, and 0 to 6 parts by weight of a cereal binder.

2. A hot top structure as defined in claim 1 wherein 90% of the cellular granular clay material and sand mix has a grain size greater than 140 U.S. mesh.

3. A hot top refractory member as defined in claim 1 which comprises a panel member and said body portion has substantially parallel front and back sides.

4. A hot top structure as defined in claim 3 wherein said panel has a modulus of rupture of at least approximately 250 lbs. per sq. inch and wherein said panel has a thickness between said front and back sides of between 1" and 2".

5. A hot top refractory member as defined in claim 1 wherein said body has substantially parallel front and rear sides and edge surfaces, each of said edge surfaces being in a plane defining an obtuse included angle with said front side.

6. A hot top refractory member comprising a body having a surface adapted to contact molten metal, said body being constructed of a material including a cellular granular clay material having a density of approximately 25 to 35 lbs. per cu. ft. and a binder therefor, said body having a density of between 30 to 90 lbs. per cu. ft. and a modulus of rupture of at least 250 lbs. per sq. inch, and wherein said panel has a thickness of between 1" and 2".

7. An insulating hot top panel for a hot top adapted to be supported at the upper end of an ingot mold comprising a body having substantially parallel surfaces, said body adapted to be supported with one of said surfaces to be contacted with molten metal being poured into the mold, said body being at least in part constructed of a material including a cellular granular bloated expanded clay having a density of approximately 25 to 35 lbs. per cu. ft. and a binder and said part of said body having air spaces distributed throughout defined by individual grains of said cellular expanded clay.

References Cited

UNITED STATES PATENTS

| | | | |
|---|---|---|---|
| 1,921,729 | 8/1933 | Charman | 249—201 |
| 2,462,255 | 2/1949 | Charman et al. | 164—123 |
| 2,663,920 | 12/1953 | Anthony | 266—43 X |
| 2,792,214 | 5/1957 | Eusner et al. | 266—43 |
| 3,106,756 | 10/1963 | Demaison | 249—201 X |
| 3,216,689 | 11/1965 | Carpenter | 249—201 |

FOREIGN PATENTS 708,524  4/1965  Canada.

J. SPENCER OVERHOLSER, Primary Examiner

R. S. ANNEAR, Assistant Examiner

U.S. Cl. X.R.

106—38.23, 68; 249—201